(12) United States Patent
Puchianu et al.

(10) Patent No.: US 9,130,372 B2
(45) Date of Patent: Sep. 8, 2015

(54) PROTECTING AGAINST TRANSIENTS IN A COMMUNICATION SYSTEM

(71) Applicant: Vetco Gray Controls Limited, Bristol (GB)

(72) Inventors: Silviu Puchianu, Bristol (GB); Hilton Smart, Bristol (GB); Graham Morley, Bristol (GB); Julian Richard Davis, Bristol (GB); Steven Lewis Charles Simpson, Bristol (GB)

(73) Assignee: Vetco Gray Controls Limited, Bristol (GB)

( * ) Notice: Subject to any disclaimer, the term of this patent is extended or adjusted under 35 U.S.C. 154(b) by 448 days.

(21) Appl. No.: 13/714,725

(22) Filed: Dec. 14, 2012

(65) Prior Publication Data

US 2013/0154393 A1    Jun. 20, 2013

(30) Foreign Application Priority Data

Dec. 19, 2011 (EP) .................................... 11194358

(51) Int. Cl.
*H02J 3/02* (2006.01)
*H02J 3/00* (2006.01)
*H01H 9/56* (2006.01)
*H02J 13/00* (2006.01)
*H04B 3/54* (2006.01)

(52) U.S. Cl.
CPC .. *H02J 3/00* (2013.01); *H01H 9/56* (2013.01); *H02J 13/002* (2013.01); *H04B 3/54* (2013.01); *H04B 2203/5458* (2013.01); *Y02B 90/2615* (2013.01); *Y02E 60/7815* (2013.01); *Y04S 40/121* (2013.01); *Y10T 307/839* (2015.04)

(58) Field of Classification Search
USPC ..................................................... 307/2, 127
See application file for complete search history.

(56) References Cited

U.S. PATENT DOCUMENTS

| | | | | |
|---|---|---|---|---|
| 4,433,326 A * | 2/1984 | Howell | ............................ | 307/3 |
| 4,745,515 A | 5/1988 | Fowler | | |
| 5,270,703 A * | 12/1993 | Guest | ........................ | 340/854.4 |
| 5,563,459 A | 10/1996 | Kurosawa | | |
| 8,587,279 B2 * | 11/2013 | Wang et al. | .................. | 323/282 |
| 2004/0201493 A1 * | 10/2004 | Robertson | .................. | 340/854.9 |
| 2006/0187004 A1 * | 8/2006 | Vollmer et al. | .......... | 340/310.11 |

(Continued)

FOREIGN PATENT DOCUMENTS

WO         0103323 A1    1/2001

OTHER PUBLICATIONS

Search Report and Written Opinion from corresponding EP application No. 11194358.5, dated Apr. 5, 2012.

(Continued)

*Primary Examiner* — Ronald W Leja
(74) *Attorney, Agent, or Firm* — GE Global Patent Operation

(57) ABSTRACT

A system for transmitting alternating current power and communication signals between a first location and a second location through a communication path which includes at least one inductive load and at least one switch configured to switch power to the at least one inductive load on and off is disclosed herein. The system comprises a control configured to control the at least one switch so that, if the power is switched on during a particular phase of the power, is the power is switched off during the opposite phase of the power, and if the power is switched off during a particular phase of the power, the power is switched on during the opposite phase of the power.

18 Claims, 4 Drawing Sheets

(56) References Cited

U.S. PATENT DOCUMENTS

| | | | |
|---|---|---|---|
| 2006/0262881 A1 | 11/2006 | Cern | |
| 2013/0154393 A1* | 6/2013 | Puchianu et al. | 307/127 |
| 2014/0105311 A1* | 4/2014 | Agusti Costa et al. | 375/257 |
| 2014/0341235 A1* | 11/2014 | Tagashira et al. | 370/479 |
| 2014/0346857 A1* | 11/2014 | Puchianu et al. | 307/2 |

OTHER PUBLICATIONS

Hove, M. et al: "The Effect of Type of Transient Voltage Suppressor on the Signal Response of a Coupling Circuit for Power Line Communications," AFRICON, 2011, IEEE, Sep. 13, 2011, pp. 1-6, XP031989980, DOI: 10.1109/AFRCON.2011.6072050, ISBN:978-1-61284-992-8.

* cited by examiner

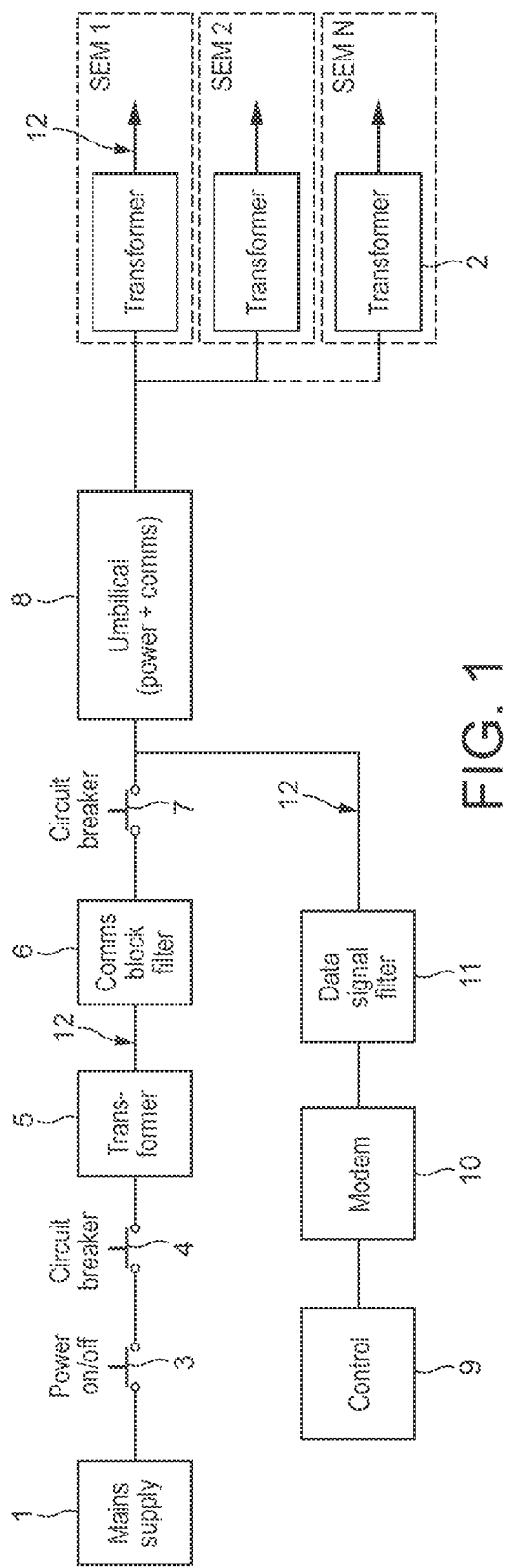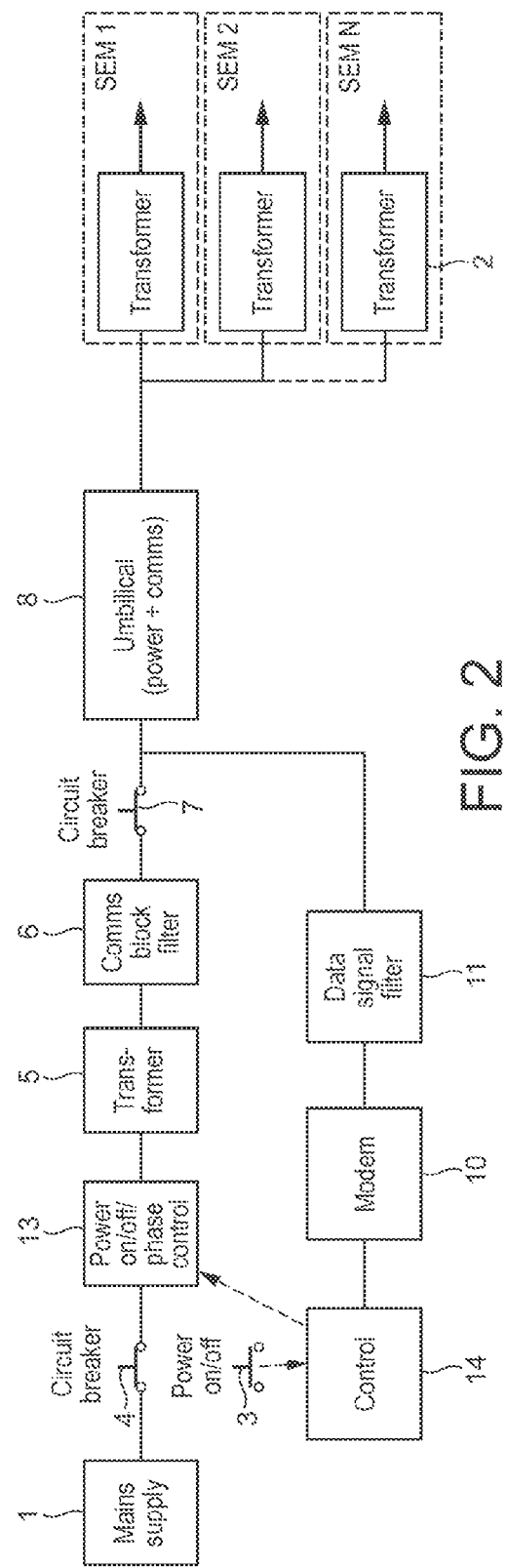

PROTECTING AGAINST TRANSIENTS IN A COMMUNICATION SYSTEM

BACKGROUND OF THE INVENTION

Embodiments of the present invention relate to protecting against transients in a communication system, for example, in a subsea fluid production well power and communication system.

In subsea fluid production well power and communication systems, the voltage transients inherently associated with power on/off switching of inductive loads are potentially very damaging because communication modems are directly coupled (connected electrically) to power lines in order to implement communication on power (COP) systems. High voltage transients may damage topside and subsea modems used in COP-based communication systems and topside and subsea power distribution transformers.

BRIEF DESCRIPTION OF THE INVENTION

According to an embodiment of the invention, there is provided a system for transmitting alternating current power and communication signals between a first location and a second location through a communication path, the communication path comprising at least one inductive load and at least one switch configured to switch power to the at least one load on and off. The system comprises a control configured to control the at least one switch so that, if the power is switched on during a particular phase of the power, the power is switched off during the opposite phase of the power, and if the power is switched off during a particular phase of the power, the power is switched on during the opposite phase of the power.

According to another embodiment of the invention, there is provided a method for transmitting alternating current power and communication signals between a first location and a second location through a communication path, the communication path including at least one inductive load and at least one switch configured to switch power to the at least one inductive load on and off. The method comprises controlling the at least one switch, wherein if the the power is switched on during a particular phase of the power, controlling the at least one switch comprises switching off the power to the at least one inductive load during a phase of power that is opposite to the phase of power in which the power to the at least one inductive load is switched on. If the power is switched off during a particular phase of the power, controlling the at least one switch comprises switching on the power to the at least one inductive load during a opposite phase of power that is opposite to the phase of power in which the power to the at least on inductive load is switched off.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

BRIEF DESCRIPTION OF THE DRAWINGS

FIG. 1 is a schematic diagram of a typical power and communication system for a subsea fluid production well;

FIG. 2 is a schematic diagram of a system according to an embodiment of the present invention;

DETAILED DESCRIPTION OF THE EXEMPLARY EMBODIMENTS OF THE INVENTION

Figure 3:
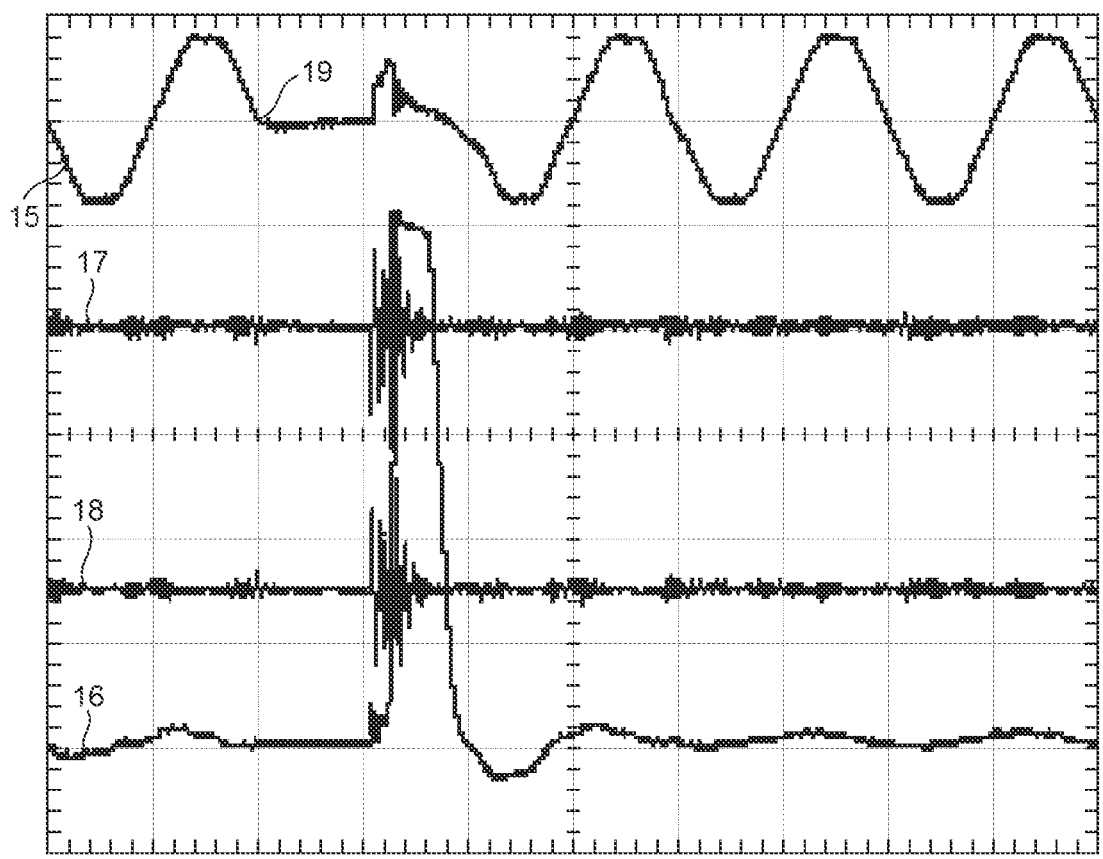
FIG. 3 is derived from oscilloscope traces for illustrating transient problems.

FIG. 1 shows a typical COP-based control system for a subsea fluid (e.g. hydrocarbon) production well, in which topside alternating current (AC) mains power from a mains supply 1 (e.g. on a surface platform) is supplied to transformers 2 in subsea electronics modules SEM1, SEM2 - - - SEMN at respective fluid production wells, via a power on/off switch 3, a circuit breaker 4, a topside transformer 5, a communications blocking filter 6, a circuit breaker 7 and an umbilical cable 8 between topside and the subsea wells. Control communications are superimposed under the control of control electronics 9 on to the AC power, after the circuit breaker 7, by a modem 10 and a data signal filter 11. When the power on/off switch 3 or a circuit breaker 4 or 5 is operated, high voltage transients occur at points 12 of the system, which are the result of reactive power being rapidly discharged within the system. The remanant magnetic energy, stored in inductive elements (transformers and inductors), is rapidly discharged through the system and high transient inrush currents occur, with potentially catastrophic consequences.

FIG. 2 (in which items which correspond with those in FIG. 1 have the same reference numerals as in FIG. 1) shows an embodiment of the present invention, power switching in the system being changed by replacing the simple on/off switch 3 by a phase-controlled power on/off switch 13, the action of switch 3 now being via control electronics 14 which control the switch 13 as well as modem 10 and filter 11. More particularly, switch 13 switches power at a controlled phase angle of the voltage waveform, typically via a thyristor or triac. Switching of power on and off is phase-controlled to ensure that the downstream load is powered up on the opposite phase of the supply to that when powered off. For example, if the system is powered on at, as an example, the positive power half cycle of the power, it is always powered off in the negative power half cycle, thus ensuring the delivery of an equal number of positive and negative power half cycles to the load, thereby leaving the downstream magnetic components with a residual magnetic field that should suppress (rather than enhance) the inrush current transient surge generation when the system is next powered on (with the appropriate phase-synchronised power control).

The reason for this process is that switching off the power supply to a transformer results in, typically, a residual magnetic flux stored in the core. If the power is switched on at a part of the AC supply cycle polarity that enhances this flux, then the transformer may go into saturation, resulting in a large input current, and, as there is no longer a change of core flux and thus no back electromotive force (EMF), it is only limited by the resistance of the winding. This high current typically results in severe distortion or collapse of the supply voltage with the rapid change of supply voltage generating harmonics whose frequencies can encroach on the communication band of a COP system and corrupt communications. This, along with potential damage that can be caused by the high inrush currents, can be catastrophic.

FIG. 3. is derived from actual oscilloscope traces recorded during power on/off tests on a SEM transformer that demonstrates this phenomenon and shows a voltage (trace 15) applied to a primary winding of the transformer, the current (trace 16) in the primary winding, a COP system communication output (trace 17) and a complement (trace 18) of trace 17. The phase point 19 in trace 15 where power is switched on is at the beginning of a negative cycle. It can be seen that there is a large current in the primary winding (trace 16) and a collapse of the supply voltage (trace 15) which has generated harmonics which have resulted in noise bursts in the COP communication channel (traces 17 and 18).

One alternative, simple way to avoid the transients problem is to have a larger core to the transformer so that it will not go into saturation, but this is not an option in subsea equipment where minimization of mass and volume is essential. The above method of ensuring that power on and off is phase-controlled, to ensure that the downstream load is powered up on the opposite phase of the supply to that when powered off, allows retention of transformers with low mass and volume without the risk of transients causing damage and COP communication corruption.

The above solution of the transient problem can, however, be augmented since, if a circuit breaker opens, or the power is unintentionally cut for any other reason, the power off will not be phase-controlled, and thus the required inverse phase at re-switching on will not be known. This can be dealt with by the addition of pre-magnetization of the transformers. This technique involves applying, temporarily, a small DC voltage to the primary winding of each transformer to set its core remanence in a known direction. This provides knowledge of the phase of the restored AC power required to 'oppose' this remanent flux, thus avoiding application of power at a phase which will drive the core flux into saturation and cause transient problems.

Figure 4:
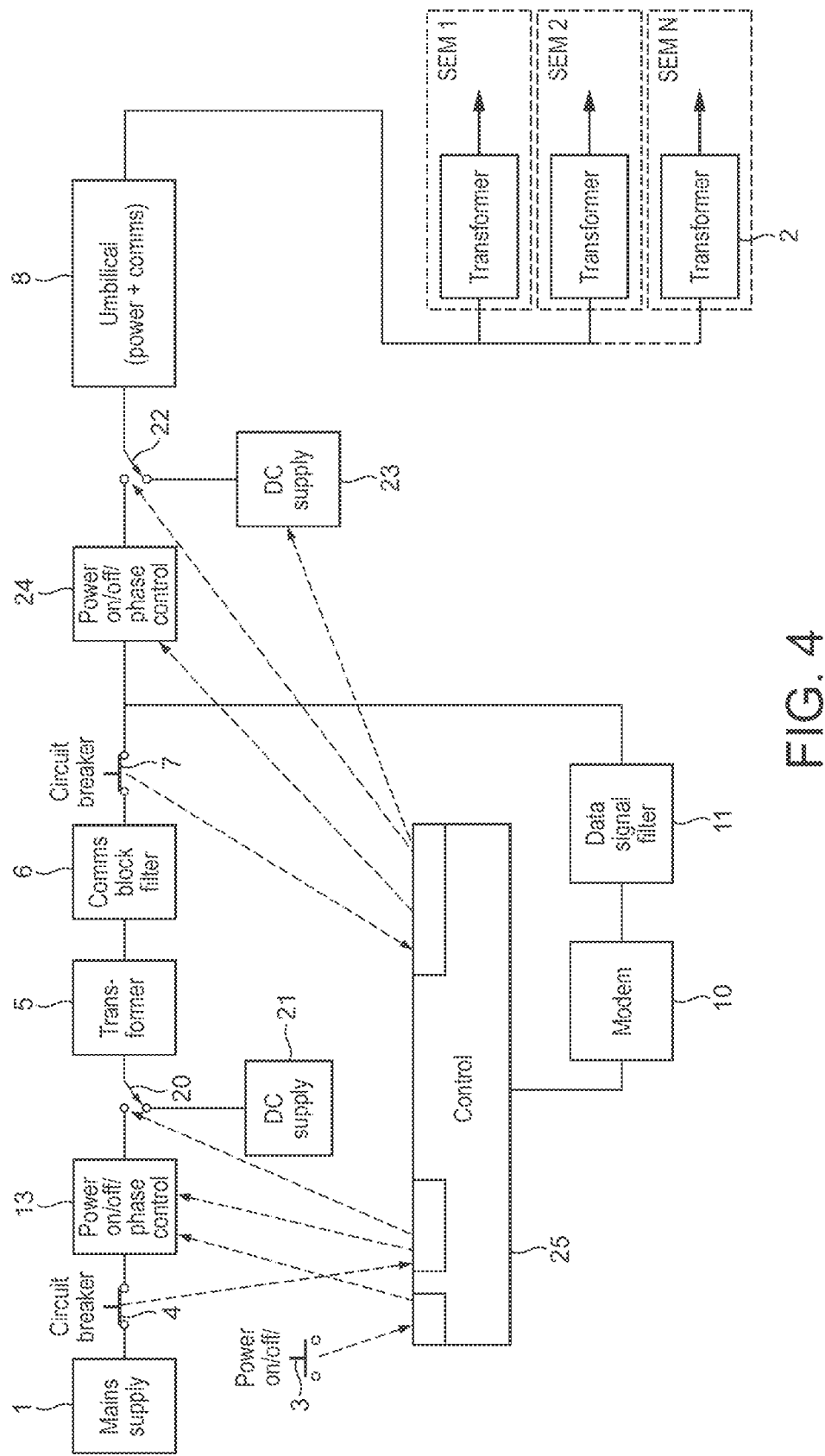
FIG. 4 is a schematic diagram of a a system according to an embodiment of the present invention.

FIG. 4 (in which items which correspond with those in FIG. 2 have the same reference numerals as in FIG. 2) shows the application of this feature to the topside transformer 5. If the circuit breaker 4 opens, a switch 20 between phase-controlled switch 13 and transformer 5 operates for a short period of time and connects a DC supply circuit 21 (typically providing only about 9 volts or so) to the primary winding of the transformer 5, thus setting its core remanence in a known direction, dependent on the polarity of the DC supply applied. Following this, the power on/off phase control-led switch 13, is set to apply, when the circuit breaker 4 is reset, the first AC supply phase required to reverse the remanence set by the DC supply circuit 20, thus ensuring that the core of transformer 5 does not go into saturation and thus preventing the problem of high inrush current, supply voltage collapse and corruption of the COP communication which arises without the pre-magnetization technique.

As shown in FIG. 4, the same technique is applied to the subsea transformers 2 housed in the SEM 1 to SEM N with the DC supply pre-magnetization applied to all the SEM transformers from the topside via the umbilical cable 8. Thus, opening of the circuit breaker 7 (or circuit breaker 4) causes a switch 22 to operate, momentarily connecting a DC supply circuit 23 to the transformers 2 of SEM 1 to SEM N, followed by the setting of a power on/off phase-controlled switch 24 to apply the correct phase of the AC supply, when re-connected to the transformers, i.e. to reverse the remanent flux in the transformer cores previously pre-set by the DC supply at power off.

The above is effected under the control of topside control electronics 25 acted on by switch 3 and circuit breakers 4 and 7 and connected to control switches 13, 20, 22 and 24.

Figure 5:
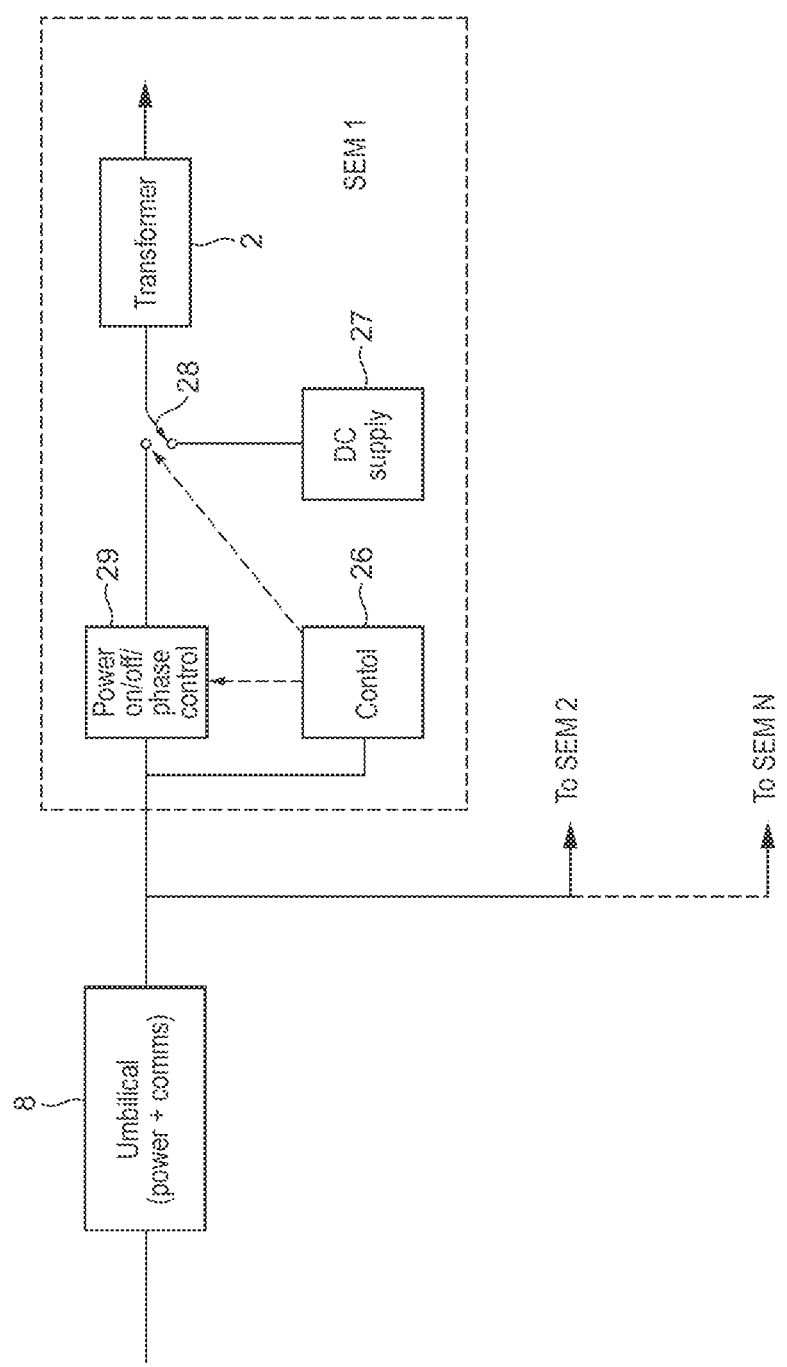
FIG. 5 is a schematic diagram of part of a system according to an embodiment of the present invention.

FIG. 5 shows an alternative arrangement to pre-magnetize the transformers in the SEMs by incorporating the required circuitry, power-on phasing and control within each SEM, subsea. In this case in each SEM respectively, control electronics 26 in the SEM will have to have its power supply sustained for a few seconds when the incoming power via the umbilical 8 is switched off, and also contain circuitry to detect switch-off of power, whereupon a DC supply circuit 27 (typically receiving power from the control electronics power supply) is momentarily connected to the transformer 2 by a switch 28. At power restoration via the umbilical 8, a power on/off phase-controlled switch 29 (typically a triac or thyristors) will not restore power to the transformer until the control electronics 26 allows it to switch on at the correct phase of the AC supply.

As described above, an embodiment of the present invention provides a system for transmitting alternating current power and communication signals between a first location and a second location via a communication path, the communication path including at least one inductive load and at least one switching means for switching power to at least one load on and off, the system comprising control means adapted for controlling at least one switching means so that, if the power is switched on during a particular phase of the power, it is switched off during the opposite phase of the power and if the power is switched off during a particular phase of the power, it is switched on during the opposite phase of the power.

According to another embodiment of the invention, there is provided a method for transmitting alternating current power and communication signals between a first location and a second location via a communication path, the communication path including at least one inductive load and at least one switching means for switching power to at least one load on and off. The method comprises controlling at least one switching means so that, if the power is switched on during a particular phase of the power, it is switched off during the opposite phase of the power and, if the power is switched off during a particular phase of the power, it is switched on during the opposite phase of the power.

The control means is further adapted for controlling at least one switching means so that, in response to switching off the power, a direct current is applied to at least one inductive load and, in response to actuation of at least one switching means to switch the power on, the power is switched on during a phase of the power which results in a magnetization of at least one inductive load opposite to that resulting from the direct current. At least one such inductive load could be at the first location. At least one such inductive load could be at the second location. At least one such switching means could be at the first location. At least one such switching means is at the second location. At least one inductive load typically comprises a winding of a transformer.

A system according to embodiments of the invention comprises a power and communication system for a subsea well and a method according to embodiments of the invention performed in such a system. In these cases, the first location may be a topside location and the second location may be a subsea electronics module.

Embodiments of the present invention allow the use of transformers with flux densities that are close to saturation, and therefore low volume and mass, in subsea power systems with COP communications without the problems of system component damage, such as modems and corruption of communications when the power supply is switched off or on.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for transmitting alternating current power and communication signals between a first location and a second location through a communication path, the communication path comprising at least one inductive load and at least one switch configured to switch power to the at least one inductive load on and off, the system comprising:
   a control configured to control the at least one switch so that, if the power is switched on during a particular phase of the power, the power is switched off during the opposite phase of the power, and if the power is switched off during a particular phase of the power, the power is switched on during the opposite phase of the power.

2. The system according to claim 1, wherein the control is further configured to control the at least one switch so that, in response to switching the power off, a direct current is applied to the at least one inductive load and, in response to actuation of the at least one switch to switch the power on, the power is switched on during a phase of the power which results in a magnetization of the at least one inductive load opposite to that resulting from the direct current.

3. The system according to claim 1, wherein the at least inductive load is at the first location.

4. The system according to claim 1, wherein the at least one inductive load is at the second location.

5. The system according to claim 1, wherein the at least one such switch is at the first location.

6. The system according to claim 1, wherein the at least one switch is at the second location.

7. The system according to claim 1, wherein the at least one inductive load comprises a winding of a transformer.

8. The system according to claim 1, wherein the system comprises a power and communication system for a subsea well.

9. The system according to claim 8, wherein the first location is a topside location and the second location comprises a subsea electronics module.

10. A method for transmitting alternating current power and communication signals between a first location and a second location through a communication path, the communication path comprising at least one inductive load and at least one switch configured to switch power to the at least one load on and off, the method comprising:
    controlling the at least one switch, wherein:
    if the power is switched on during a particular phase of the power, controlling the at least one switch comprises switching off the power to the at least one inductive load during a phase of power that is opposite to the phase of power in which the power to the at least one inductive load is switched on; and
    if the power is switched off during a particular phase of the power, controlling the at least one switch comprises switching on the power to the at least one inductive load during a phase of power that is opposite to the phase of power in which the power to the at least on inductive load is switched off.

11. The method according to claim 10, wherein:
    if the power is switched off, controlling the at least one switch comprises applying a direct current to the at least one inductive load; and
    if the power is switched on, controlling the at least one switch comprises switching the power on during a phase of the power which results in a magnetization of the at least one inductive load opposite to that resulting from the direct current.

12. The method according to claim 10, wherein the at least one inductive load is at the first location.

13. The method according to claim 10, wherein the at least one inductive load is at the second location.

14. The method according to claim 10, wherein the at least one switch is at the first location.

15. The method according to claim 10, wherein the at least one switch is at the second location.

16. The method according to claim 10, wherein the at least one inductive load comprises a winding of a transformer.

17. The method according to claim 10, performed in a power and communication system for a subsea well.

18. The method according to claim 17, wherein the first location is a topside location and the second location comprises a subsea electronics module.

* * * * *